United States Patent
Lin et al.

(10) Patent No.: US 11,503,611 B2
(45) Date of Patent: Nov. 15, 2022

(54) METHOD AND APPARATUS FOR ALLOCATION OF RESOURCES IN A WIRELESS COMMUNICATION SYSTEM

(71) Applicant: HON LIN TECHNOLOGY CO., LTD., Taipei (TW)

(72) Inventors: Ching-Ju Lin, Hsinchu (TW); Yu-Hsuan Liu, Hsinchu (TW); Chi-Mao Lee, Taipei (TW); Ping-Jung Hsieh, Hsinchu (TW); Tun-Yu Yu, Hsinchu (TW); Ming-Yu Lee, Hsinchu (TW)

(73) Assignee: HON LIN TECHNOLOGY CO., LTD., Taipei (TW)

( * ) Notice: Subject to any disclaimer, the term of this patent is extended or adjusted under 35 U.S.C. 154(b) by 195 days.

(21) Appl. No.: 17/003,034

(22) Filed: Aug. 26, 2020

(65) Prior Publication Data

US 2021/0127400 A1   Apr. 29, 2021

Related U.S. Application Data

(60) Provisional application No. 62/927,443, filed on Oct. 29, 2019.

(51) Int. Cl.
*H04W 72/08* (2009.01)
*H04W 72/04* (2009.01)

(52) U.S. Cl.
CPC ....... *H04W 72/082* (2013.01); *H04W 72/046* (2013.01)

(58) Field of Classification Search
CPC .................. H04W 72/082; H04W 72/046
See application file for complete search history.

(56) References Cited

U.S. PATENT DOCUMENTS

| | | | |
|---|---|---|---|
| 6,940,917 | B2 | 9/2005 | Menon et al. |
| 7,714,781 | B2 | 5/2010 | Xia et al. |
| 7,714,783 | B2 | 5/2010 | Niu et al. |
| 8,619,886 | B2 | 12/2013 | Nsenga et al. |
| 8,837,305 | B2 | 9/2014 | Nanda et al. |
| 9,094,977 | B2 | 7/2015 | Li et al. |
| 9,137,698 | B2 | 9/2015 | Li et al. |
| 9,203,497 | B2 | 12/2015 | Kim et al. |
| 10,056,957 | B2 | 8/2018 | Han et al. |
| 10,312,981 | B2 | 6/2019 | Chen et al. |
| 2012/0051315 | A1* | 3/2012 | Wang ............... H04W 72/082 370/329 |
| 2013/0003583 | A1* | 1/2013 | Landstrom ............ H04L 5/006 370/252 |
| 2013/0045675 | A1* | 2/2013 | Park .................. H04B 7/2041 455/12.1 |
| 2016/0262077 | A1* | 9/2016 | Zhang ............... H04W 36/0085 |

(Continued)

FOREIGN PATENT DOCUMENTS

| WO | 2019/173755 A1 | 9/2019 |
|---|---|---|
| WO | 2019/173775 A1 | 9/2019 |

*Primary Examiner* — Jasper Kwoh
(74) *Attorney, Agent, or Firm* — ScienBiziP, P.C.

(57) ABSTRACT

A method for allocating wireless resources for a number of user equipment in a wireless communication system is applied in an apparatus. The apparatus collects the traffic demands of all the user equipment and then selects a beam based on the traffic demands of all the user equipment in every time slot to make better utilization of resource blocks.

8 Claims, 8 Drawing Sheets

(56) References Cited

U.S. PATENT DOCUMENTS

| | | |
|---|---|---|
| 2017/0223689 A1 | 8/2017 | Son et al. |
| 2018/0131486 A1* | 5/2018 | Liu ..................... H04B 7/0695 |
| 2019/0222384 A1 | 7/2019 | Wu et al. |
| 2020/0045725 A1* | 2/2020 | Mochizuki ............ H04W 16/28 |
| 2020/0336196 A1* | 10/2020 | Ku ........................ H04W 24/10 |

* cited by examiner

METHOD AND APPARATUS FOR ALLOCATION OF RESOURCES IN A WIRELESS COMMUNICATION SYSTEM

CROSS-REFERENCE TO RELATED APPLICATION

This application claims priority to U.S. Provisional Patent Application No. 62/927,443, filed on Oct. 29, 2019, and entitled "Traffic-Aware Beam Management and Resource Allocation for LTE", the contents of which are incorporated by reference herein.

FIELD

The subject matter herein generally relates to radio communications.

BACKGROUND

In an Orthogonal Frequency Division Multiple Access (OFDMA) system, a resource block (RB) is the smallest unit of resources. Each time slot consists of multiple RBs operating over different subcarriers, which can be allocated to multiple user equipment (UEs). However, only one fixed set of beams can be configured in a time slot. If a fixed beam combination is configured, the OFDMA system may support a high data rate for UEs in some RBs, but leave the remaining RBs underutilized in the same time slot, thus lowering the overall spectrum utilization.

Thus, there is room for improvement within the art.

BRIEF DESCRIPTION OF THE DRAWINGS

Implementations of the present technology will now be described, by way of embodiment, with reference to the attached figures, wherein.

DETAILED DESCRIPTION

Figure 1:
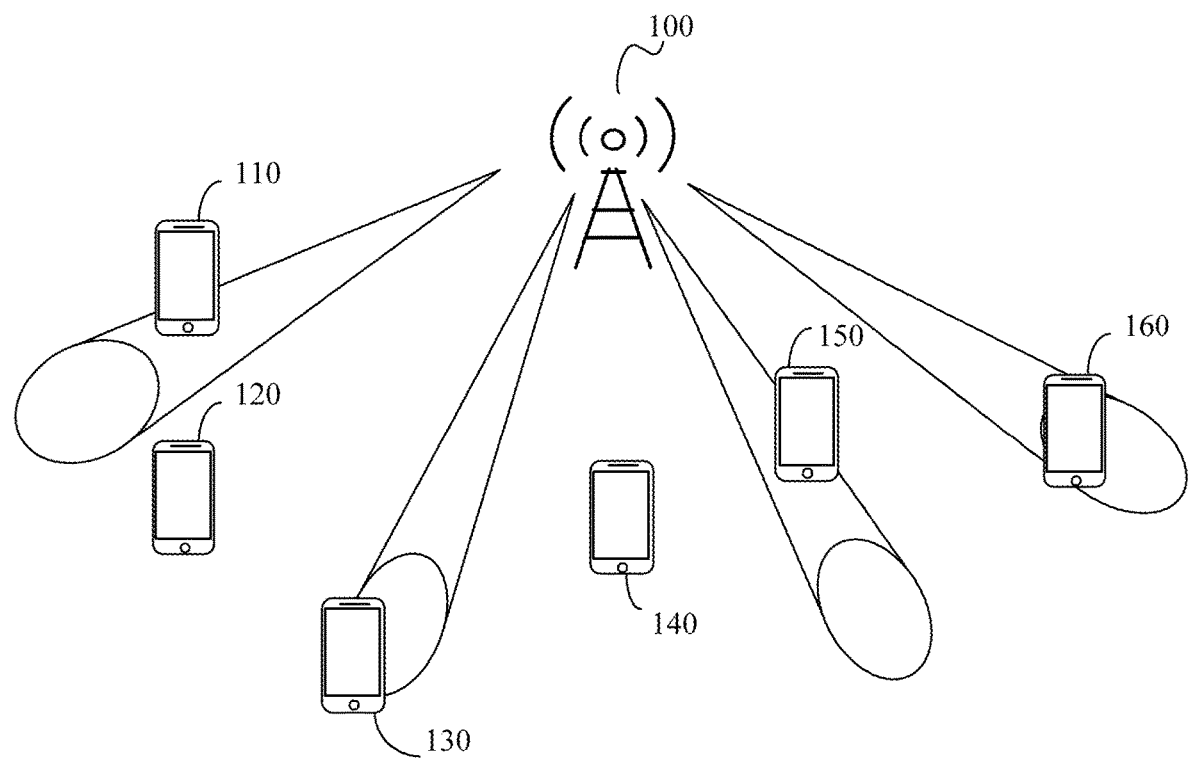
FIG. 1 is a schematic diagram of one embodiment of a wireless communication system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or another storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 illustrates a wireless communication system according to one embodiment. The wireless communication system comprises a base station (BS 100), and a plurality of user equipment, for example, six UEs (UE 110-UE 160). The wireless communication system supports communications using a variety of cellular technologies comprising 4G LTE and 5G New Radio (NR). The BS 100 provides wireless access to the UEs 110-160. The BS 100 may include an access point (AP), Evolved Node B (eNB), Node B (NB), home Node B (HNB), BS transceiver, BS device, and cell site device. Each of the UEs 110-160 is a user device performing communication with the BS 100. Although each of the UEs 110-160 is shown as a cellular phone in FIG. 1, the techniques herein are applicable to a wide variety of UE, such as mobile devices, tablets, laptops, IoT devices, and wearable devices, etc.

In one embodiment, BS 100 performs beamforming to control the magnitude and phase of individual antenna signals and steers multiple beams in different directions to serve the UEs 110-160 concurrently. The BS 100 can obtain traffic demands of the UEs through the number of packets queued in a buffer and govern optimal beam direction for each of the UEs 110-160 by beam management procedure as defined in the 5G NR standard.

The BS 100 can only configure one set of beams during a time slot, but an acceptable signal quality can be obtained if the BS 100 serving it uses a non-optimal beam, although maximal receiving power can only be achieved if it is served by the BS 100 using its optimal beam. In the downlink scenario, each of the UEs may be referred to as "primary UE" of a beam if served by its optimal beam, or as "secondary UE" of a beam if the beam is not its optimal beam.

In one embodiment, the BS 100 applies a hybrid beamforming architecture and supports B beams and N RF chains, in which each N RF chain is connected to a phased array (also referred to as "phased antenna array" or simply "antenna array"). $B=\{b_1, b_2, \ldots, b_B\}$ denotes the set of pre-defined beam patterns. Then, each phased array can steer toward one pre-defined directions of B. That is, N phased arrays simultaneously steer N different beams to serve N UEs at most in each RB. The BS 100 first selects a suitable subset of beams and allocates RBs to the corresponding primary UEs. If the RBs are not fully utilized due to the limited demands of primary UEs, the BS 100 then allocates the remaining RBs to the secondary UEs in order to improve spectrum utilization.

Figure 2:
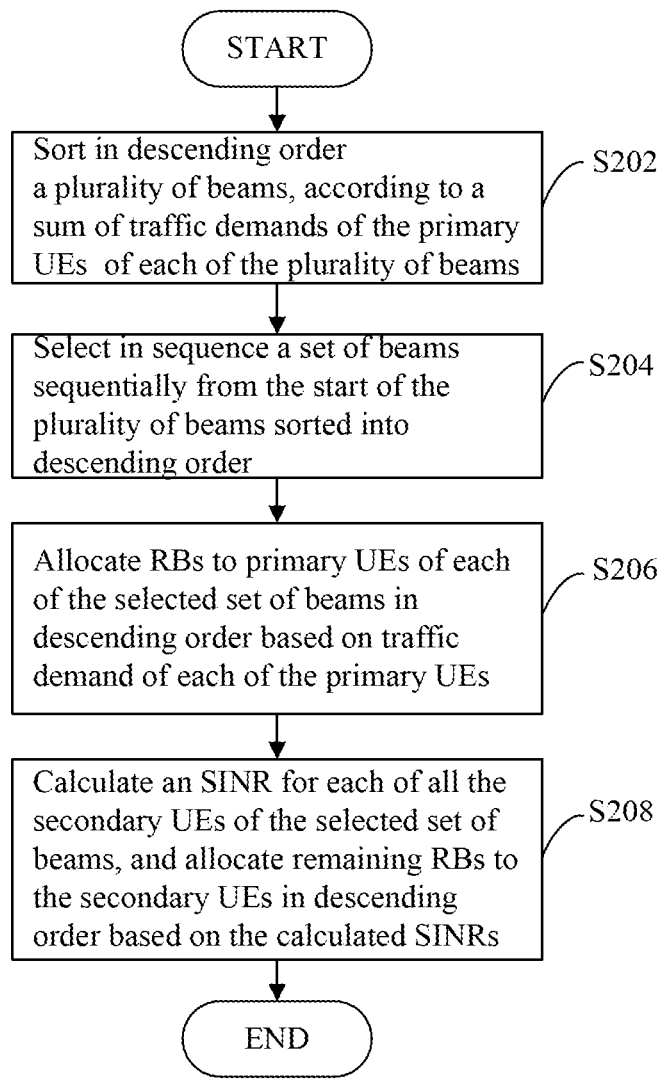
FIG. 2 is a flowchart of one embodiment of a method for allocation of resources in the wireless communication system.

FIG. 2 illustrates a method for the allocation of resources at every time slot by the BS 100 according to one embodiment.

At step S202, the BS 100 sorts in descending order a plurality of beams, according to a sum of traffic demands of the primary UEs of each of the plurality of beams. Before step S202, the BS 100 identifies the primary UEs of each of the plurality of beams, wherein the primary UEs are served by their optimal beams. The BS 100 also identifies the secondary UEs of each of the plurality of beams, wherein the secondary UEs are the UEs which are not served by their optimal beams. In one embodiment, the primary UEs of a specific beam can be identified by the BS 100 according to a beam management procedure defined in the 5G NR standard, for example, by a beam tracking algorithm or a beam sweeping procedure. In one embodiment, the BS 100 obtains the traffic demand of each of the UEs by monitoring packets queued in a buffer.

At step S204, the BS 100 selects in sequence a set of beams from the start of the plurality of beams sorted into descending order.

At steps S206, the BS 100 allocates RBs to primary UEs of each of the selected sets of beams in descending order based on the traffic demand of each of the primary UEs.

In some scenarios, there may be some RBs not utilized even though the traffic demands of all the primary UEs have been served. To enhance resource utilization, the BS 100 allocates the remaining, i.e., unallocated, RBs to the secondary UEs if they can obtain an acceptable signal-to-interference-plus-noise (SINR) and receive data properly. Since the secondary UEs cannot be served by an optimal beam, the BS 100 allocates the remaining RBs to the secondary UEs that still have traffic demands and can achieve the maximal SINR.

At step S208, the BS 100 calculates an SINR for each secondary UE of the selected set of beams, and allocates remaining RBs to the secondary UEs in descending order based on the calculated SINRs.

In one embodiment, the best polarization configuration of each subset of the plurality of beams can be obtained based on the measured radiation pattern and inter-beam interference. The measured radiation pattern corresponding to the selected set of beams can then be used to calculate the achievable SINR of each of the secondary UEs.

Figure 3:
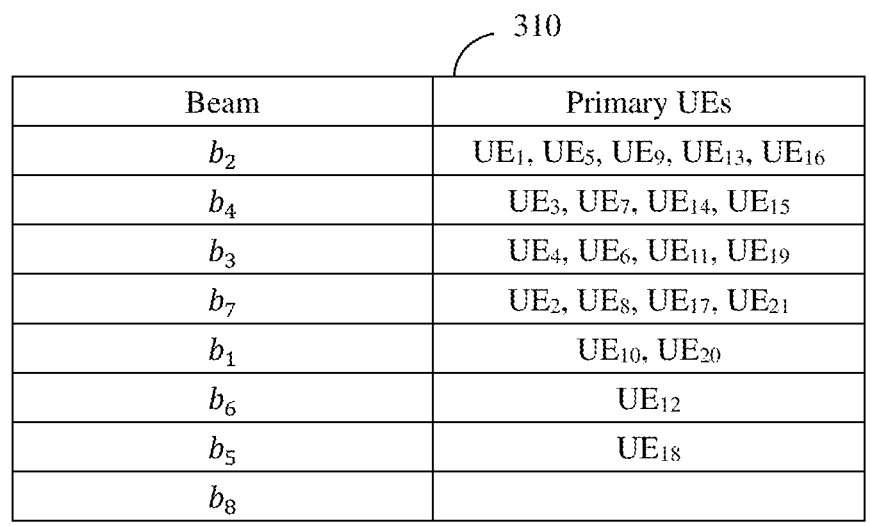
FIG. 3 is a schematic diagram of a user equipment demand table in one embodiment.

In one embodiment, the BS 100 maintains the user demand table shown in FIG. 3, updates the user demand table and the sorting in every time slot to allocate RBs. FIG. 3 illustrates the sorted user demand table 310 of an exemplary wireless communication system. The BS of such a wireless communication system supports B=8 available beams and N=4 RF chains. Then, in each time slot, the BS sorts beams in descending order of the sum of the traffic demands of their primary UEs. The BS then selects a set of beams with TOP-N demands, to serve downlink UEs. In FIG. 3, for example, the BS selects the set={$b_2$, $b_4$, $b_3$, $b_7$} with the top demands.

Figure 4A:
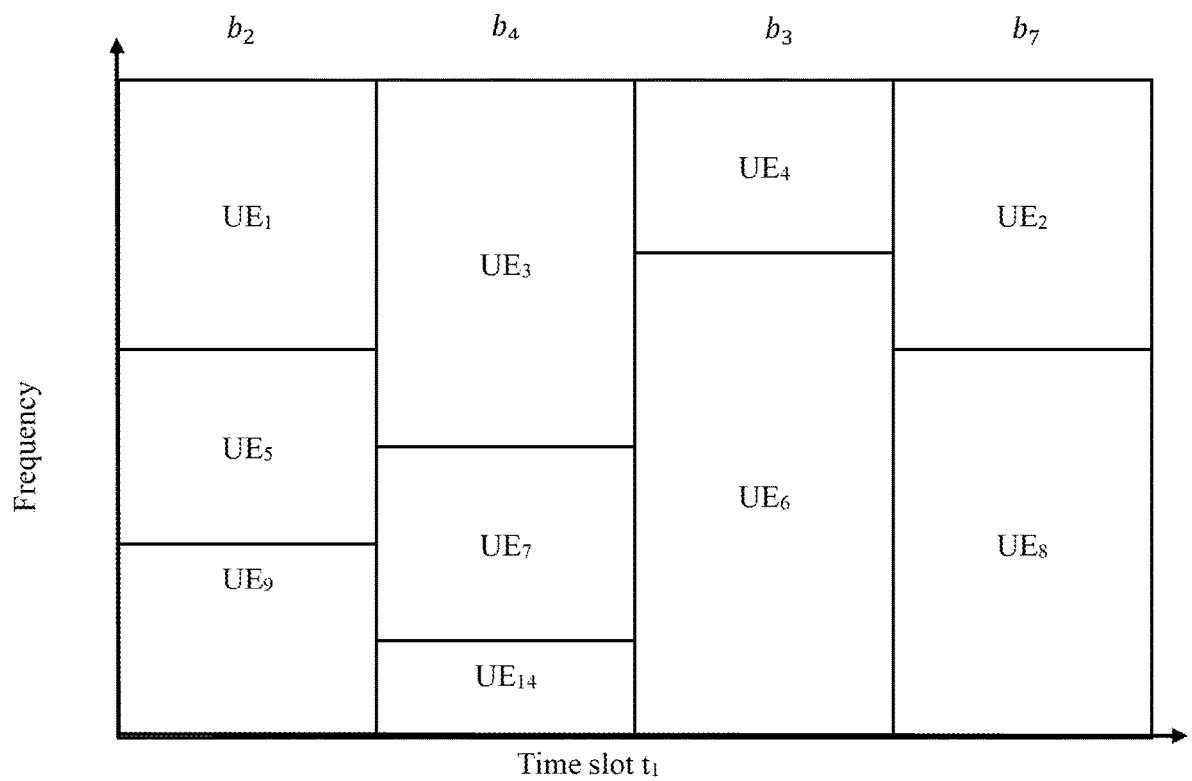
FIGS. 4A, 4B, 4C are schematic diagrams showing resource allocation in the wireless communication system in one embodiment.

In this embodiment, to improve spectrum utilization, the BS also sorts the primary UEs of each of the beams in descending order based on their traffic demands as shown in FIG. 3. The BS then allocates RBs to the primary UEs of the selected beams in descending order of their demands. FIG. 4A illustrates an example of RBs allocated in order to primary UEs of all the selected beams for the user demand table 310 in time slot $t_1$. In this example, the RBs are fully utilized for beams $b_2$, $b_4$, $b_3$ and $b_7$ in the time slot $t_1$.

Figure 4B:
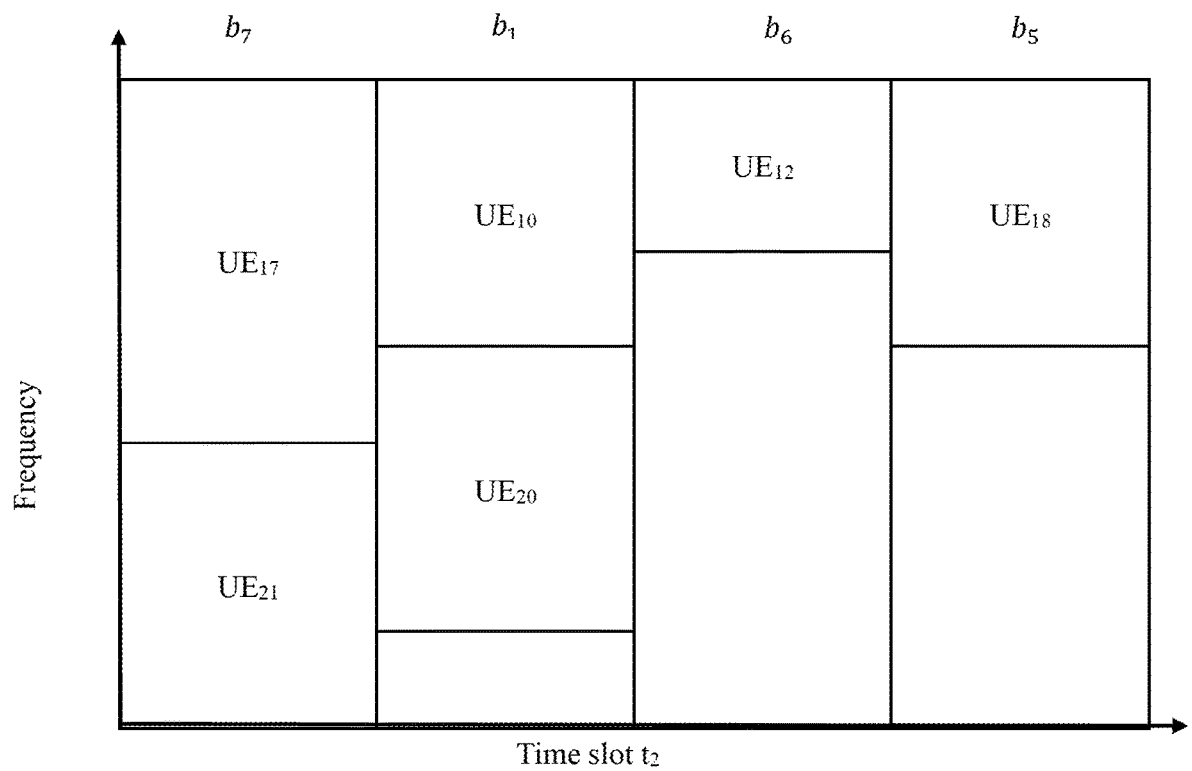
Figure 4C:
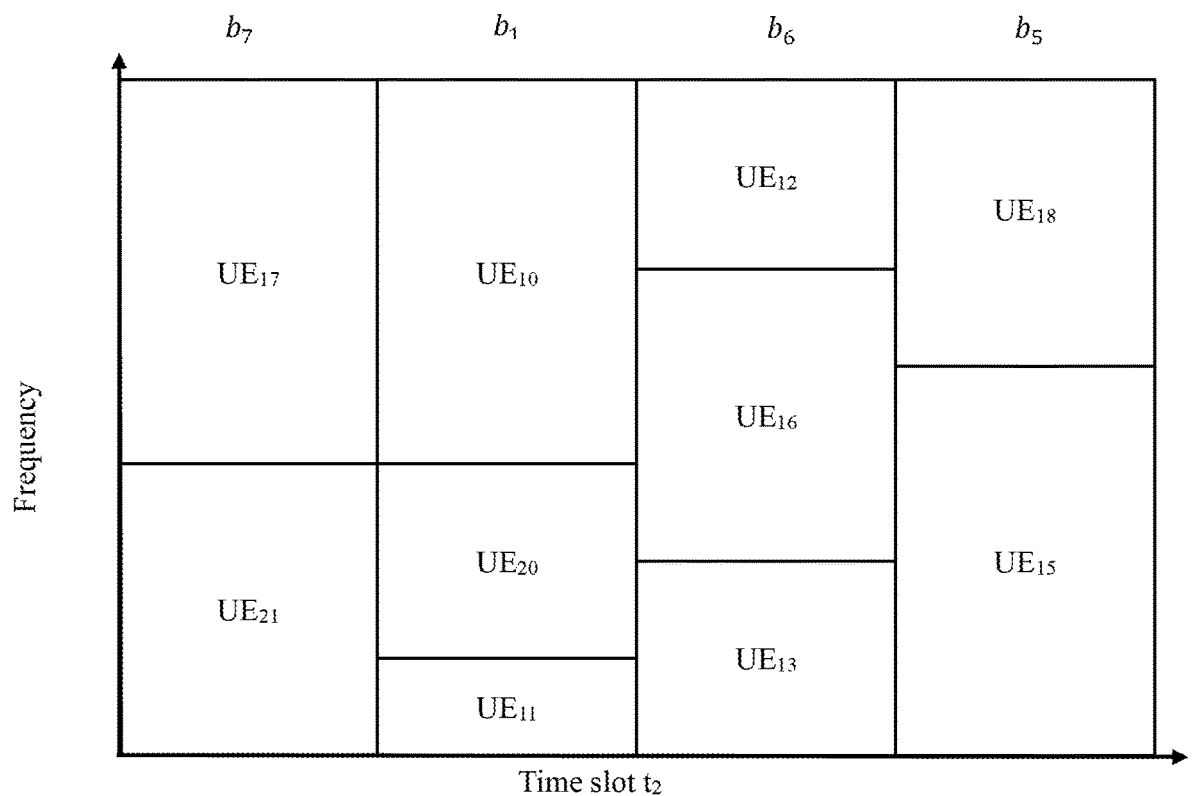

FIG. 4B illustrates an updated user demand table 312 after RBs allocation by the BS in the time slot $t_1$. The BS then allocates RBs based on the updated user demand table 320 in time slot $t_2$. As shown in FIG. 4B, some RBs of beams $b_6$ and $b_5$ are not allocated yet due to insufficient traffic demands of their primary UEs. Since beams $b_6$ and $b_5$ are not fully utilized due to non-saturated traffic demands, the BS firstly updates the user demand table as an updated user demand table 314 (shown in FIG. 4C), then allocates the remaining RBs to the secondary UEs that still have traffic demands and can achieve the maximal SINR. In this example, the remaining RBs are allocated to secondary UEs, such as $UE_{11}$, $UE_{16}$, $UE_{13}$, and $UE_{15}$, in the time slot $t_2$, as shown in FIG. 4C.

In a beamforming technology, steering a beam toward a direction d may lead to several side lobes in undesired directions d'≠d. Although a primary UE can be served by its optimal beam, it is also very likely to be interfered with by the side lobes of other beams. In one embodiment, to avoid selecting beams that create beam patterns leading to strong interference with others, the BS 100 estimates a level of interference of the set of beams and determines whether to re-select the set of beams according to a level of interference of the set of beams before executing step S204.

Figure 5:
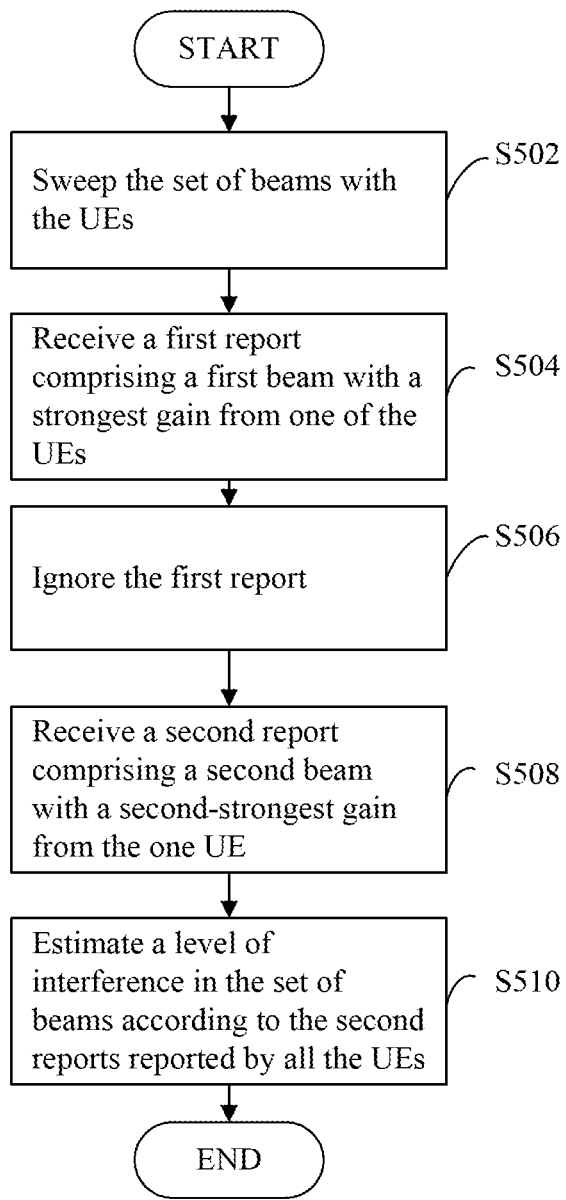
FIG. 5 is a flowchart of one embodiment of a method for estimating a level of interference in a set of beams.

In one embodiment, the BS 100 performs a beam-sweeping procedure for the set of beams. Once the beam with the strongest gain of a UE is determined by the BS 100, the BS 100 proceeds to determine the beam with the second-strongest gain of the UE, which will be the strongest interfering beam of the UE. After collecting the strongest interfering beams of all the UEs, the BS 100 then estimates a level of interference of the set of beams according to the strongest interfering beams which have been collected. FIG. 5 illustrates a method for estimating the interference of the set of beams by the BS 100 according to the embodiment.

At step 502, the BS 100 sweeps the set of beams with the UEs.

At step 504, the BS 100 receives a first report comprising a first beam with a strongest gain from one UE of all the UEs.

At step 506, the BS 100 ignores the first report.

At step S508, the BS 100 receives a second report comprising a second beam with a second-strongest gain from the one UE.

At step S510, the BS 100 estimates a level of interference in the set of beams according to the second reports reported by all the UEs. In this embodiment, the level of interference of the set of beams can be approximated by the second beams of all the UEs.

The BS 100 finally makes a determination to re-select the set of beams when the level of interference exceeds a predefined level.

Figure 6:
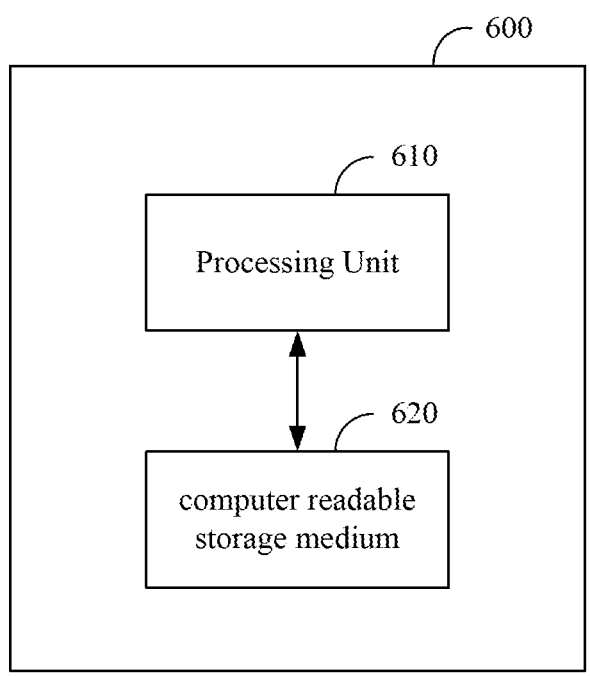
FIG. 6 is a block diagram of one embodiment of an apparatus for resource allocation in the wireless communication system.

FIG. 6 illustrates an apparatus 600 according to an embodiment. The apparatus 600 works as the BS 100. The apparatus 600 comprises a processing unit 610, and a computer readable storage medium 620. The processing unit 610 is electrically connected to the computer readable storage medium 620. The processing unit 610 comprises a microcontroller, a microprocessor, or another circuit with processing capabilities, and executes or processes instructions, data, and computer programs stored in the computer readable storage medium 620. The computer readable storage medium 620 comprises a read-only memory (ROM), a random access memory (RAM), a magnetic disk storage medium device, an optical storage medium device, a flash memory device, electrical, optical, or other physical/tangible (e.g., non-transitory) memory device, etc. A computer-readable storage medium is used to store one or more computer programs that control the operation of the apparatus 600 and executed by the processing unit 610. In the embodiment, the computer readable storage medium 620 stores or encodes one or more computer programs, and stores models, configurations, and computing parameters data, for the processing unit 610, to execute the methods shown in FIGS. 2 and 5.

The resource allocation method and apparatus of the present disclosure recognize and give priority to traffic demand in the coverage area of the apparatus 600 and allow UEs to be served by non-optimal but acceptable beams to improve resource utilization significantly.

The embodiments shown and described above are only examples. Many details are often found in the art, therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A method for resource allocation applied in a base station for a plurality of user equipment in a wireless communication system during a time slot period, the method comprising:

sorting in descending order a plurality of beams, according to a sum of traffic demands of a plurality of primary user equipment of each of the plurality of beams, wherein the plurality of primary user equipment are user equipment, which are served in optimal beams, of the plurality of user equipment, wherein the traffic demands of the plurality of primary user equipment is obtained by monitoring packets queued in a buffer;

selecting in sequence a set of beams from the plurality of beams sorted into descending order;

allocating resource blocks to the plurality of primary user equipment of each of the selected set of beams in descending order based on a traffic demand of each of the plurality of primary user equipment;

calculating a signal-to-interference-plus-noise (SINR) for each of a plurality of secondary user equipment, wherein the plurality of secondary user equipment are user equipment, which are not served in optimal beams, of the plurality of user equipment; and allocating remaining resource blocks to the plurality of secondary user equipment in descending order based on the calculated SINRs.

2. The method of claim 1, wherein prior to allocating the resource blocks, the method further comprises:

determining whether to re-select the set of beams according to a level of interference in the set of beams.

3. The method of claim 2, the method further comprises:

determining whether to re-select the set of beams when the level of interference in the set of beams exceeds a predefined level.

4. The method of claim 2, wherein the level of interference in the set of beams is obtained by strongest interfering beams of the plurality of user equipment.

5. An apparatus for resource allocation for a plurality of user equipment in a wireless communication system during a time slot period, the apparatus comprising:

a processing unit; and a computer readable storage medium for storing at least one computer program, wherein the at least one computer program comprises instructions which are executed by the processing unit, and performs a method comprising:

sorting in descending order a plurality of beams, according to a sum of traffic demands of a plurality of primary user equipment of each of the plurality of beams, wherein the plurality of primary user equipment are user equipment, which are served in optimal beams, of the plurality of user equipment, wherein the traffic demands of the plurality of primary user equipment is obtained by monitoring packets queued in a buffer;

selecting in sequence a set of beams from the plurality of beams sorted into descending order;

allocating resource blocks to the plurality of primary user equipment of each of the selected set of beams in descending order based on a traffic demand of each of the plurality of primary user equipment;

calculating a signal-to-interference-plus-noise (SINK) for each of a plurality of secondary user equipment, wherein the plurality of secondary user equipment are user equipment, which are not served in optimal beams, of the plurality of user equipment; and allocating remaining resource blocks to the plurality of secondary user equipment in descending order based on the calculated SINRs.

6. The apparatus of claim 5, wherein prior to the allocating resource blocks, the method further comprises:

determining whether to re-select the set of beams according to a level of interference in the set of beams.

7. The apparatus of claim 6, wherein the method further comprises:

determining whether to re-select the set of beams when the level of interference in the set of beams exceeds a predefined level.

8. The apparatus of claim 6, wherein the level of interference in the set of beams is obtained by strongest interfering beams of the plurality of user equipment.

* * * * *